United States Patent [19]

Nishio

[11] Patent Number: 5,188,793
[45] Date of Patent: Feb. 23, 1993

[54] DEWAXING METHOD OF METAL OR CERAMIC MOLDED BODY

[75] Inventor: Hiroaki Nishio, Tokyo, Japan
[73] Assignee: NKK Corporation, Tokyo, Japan
[21] Appl. No.: 564,492
[22] Filed: Aug. 8, 1990
[30] Foreign Application Priority Data Aug. 8, 1989 [JP] Japan ................. 1-203905

[51] Int. Cl.⁵ ............................................. C04B 41/53
[52] U.S. Cl. ..................................... 264/344; 264/63; 419/36; 419/37; 419/65
[58] Field of Search .................. 264/344, 63; 419/36, 419/37, 65

[56] References Cited

U.S. PATENT DOCUMENTS

| | | | |
|---|---|---|---|
| 2,939,199 | 6/1960 | Strivens | 264/63 |
| 3,953,562 | 4/1976 | Hait et al. | 264/63 |
| 4,197,118 | 4/1980 | Wiech | 264/63 |
| 4,731,208 | 3/1988 | Nakajima et al. | 264/344 |
| 4,820,462 | 4/1989 | Nakajima et al. | 264/63 |

FOREIGN PATENT DOCUMENTS 221674 10/1957 Australia ....................... 264/63
234420 9/1987 European Pat. Off. .
311407 4/1989 European Pat. Off. .

*Primary Examiner*—James Derrington
*Attorney, Agent, or Firm*—Sughrue, Mion, Zinn, Macpeak & Seas

[57] ABSTRACT

A dewaxing method of a metal and/or ceramic molded body which comprises immersing the metal and/or ceramic molded body formed through a plastic molding in a boiling solvent to extract the dispersion medium contained in the molded body with said solvent. According to the method of the invention, the dewaxing time can be shortened from about 150 hours to the sum of about 54 hours for the solvent extraction and about 11 hous for dewaxing under heating. The dewaxed molded body is a sound body containing no crack nor expansion.

4 Claims, 1 Drawing Sheet

DEWAXING METHOD OF METAL OR CERAMIC MOLDED BODY

BACKGROUND OF THE INVENTION

1. Field of the Invention

This invention relates to a dewaxing method of a metal or ceramic molded body formed through a plastic molding.

2. Description of the Prior Art

There is a method of manufacturing a molded body which comprises kneading a metal or ceramic powder with a dispersion medium such as plastic resin or wax under heating to obtain a compound having plasticity, and molding the compound by extrusion molding, injection molding, press molding or the like. The molded body is heated up to 400° to 600° C. to remove the dispersion medium by converting it into gases through thermal decomposition. Thereafter, the molded body is heated in vacuo or in an atmosphere of hydrogen gas, nitrogen gas, argon gas or the like to progress densification, and a sintered body is obtained.

In the above conventional dewaxing method of removing the dispersion medium, a great quantity of gas is generated by the thermal decomposition of the dispersion medium, and the gases are necessary to be removed from the inside of the molded body. Therefore, the temperature must be elevated slowly, and it requires about 150 hours. When the rate of temperature rise is erroneously set, defects such as cracking and expansion are generated in the molded body.

SUMMARY OF THE INVENTION

An object of the invention is to provide a dewaxing method of a metal or ceramic molded body capable of dewaxing without the generation of defects such as cracking and expansion in the molded body.

Another object of the invention is to provide a dewaxing method of a metal or ceramic molded body capable of shortening dewaxing time sharply.

The present invention, provides a dewaxing method of a metal and/or ceramic molded body which has achieved the above objects comprising immersing the metal and/or ceramic molded body formed through a plastic molding in a boiling solvent to extract the dispersion medium contained in the molded body with the above solvent.

BRIEF DESCRIPTION OF THE DRAWINGS

FIG. 1 shows the state prior to immersing the molded body into the solvent, and FIG. 2 shows the state of immersing the molded body in the solvent to extract the dispersion medium.

DETAILED DESCRIPTION OF THE INVENTION

Figure 1:
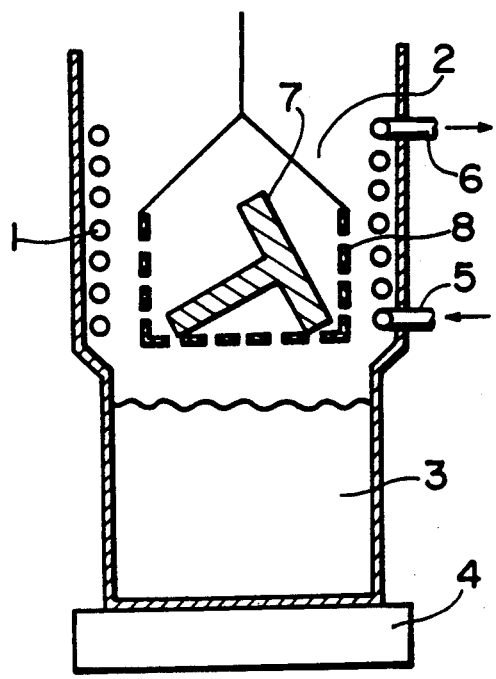
FIG. 1 and FIG. 2 are sectional views illustrating an example of the invention.

The kind of the metal of the molded body applicable to the method of the invention includes iron, Fe-Ni alloy, stainless steel, high speed steel, Ni base alloy, Co base alloy, and the like. The ceramic includes oxides such as alumina and zirconia, nitrides such as silicon nitride and aluminum nitride, carbides such as silicon carbide and boron carbide, borides such as titanium diboride and zirconium diboride, and the like. The molded body may be a cermet which is a metal-ceramic complex body, such as $Al_2O_3$-Ni alloy or WC-Co. The particle size of the metal and ceramic powder is usually about 0.2 to 100 μm. The metal or ceramic molded body optionally contains a sintering aid, various additives and the like.

A suitable dispersion medium of the metal or ceramic powder is paraffin wax expectable to exercise a forming force upon coagulation, and as the dispersion medium having a great effect to impart fluidity, there are alcohols such as methanol, ethanol, propanol and butanol, ketones such as acetone, low molecular weight hydrocarbons such as hexane and benzene, liquid paraffin, fatty acids such as stearic acid, etc. The dispersion medium may be composed of a single component or two or more components.

The solvent used in the method of the invention must have an ability to dissolve the dispersion medium. When the dispersion medium is composed of plural components, the solvent necessarily dissolves 40 to 100 wt. % of the total amount of the dispersion medium. When the extracted amount of the dispersion medium is less than 40 wt. %, it is difficult to avoid the generation of cracking in the molded body during the thermal decomposition after the extraction of the dispersion medium with the solvent. A suitable solvent has a boiling point of 30° to 150° C., preferably 20° to 60° C. When the boiling point is lower than 20° C., the boiling state is influenced by room temperature, and controlling the boiling state is difficult while when the boiling point is beyond 150° C., pores and cracks occur in the molded body during extracting the dispersion medium. The boiling point may be adjusted to the above range by controlling the pressure, if necessary. Suitable solvents are trichlorotrifluoroethane, various solvent mixtures thereof with ethanol, methylene chloride, isopropanol, acetone or the like, tetrachlorodifluoroethane, various solvent mixtures thereof with trichlorotrifluoroethane, isooctane, n-propanol or the like, trichloromonofluoromethane, trichloroethane, trichloroethylene, perchloroethylene, methylene chloride, benzene, toluene, xylene, methanol, ethanol, isopropanol, etc. Preferable solvents have a high ability to dissolve the dispersion medium and are selected according to the kind of the dispersion medium or the like. For example, when the dispersion medium is paraffin wax, preferable solvents include trichlorotrifluoroethane, a solvent mixture of trichlorotrifluoroethane and ethanol, a solvent mixture of trichlorotrifluoroethane and methylene chloride, and methylene chloride. When a low molecular weight alcohol, ketone or hydrocarbon is selected as the dispersion medium, most of the aforementioned solvents are applicable. However, trichloromonofluoromethane and methylene chloride having a low boiling point are preferred. When liquid paraffin is selected, preferable solvents are trichloromonofluoromethane, a solvent mixture of trichlorotrifluoroethane and methylene chloride. In the case of stearic acid, trichlorotrifluoroethane is applicable. According to each dispersion medium, a suitable solvent may be selected from the solvents in which the solubility of the dispersion medium is known to be high. A suitable solvent may be selected for each dispersion medium by conducting an experiment. The amount of the solvent may be determined by considering the solubility of the dispersion medium and the like. When the solubility is high, it is sufficient that all parts of the molded body can be immersed therein.

The extracting time is determined so that the dispersion medium is extracted up to a prescribed degree, and it is usually 3 to 60 hours, though it varies according to the kind of the solvent, the kind of the dispersion medium and the like. The temperature of the molded body is preferably warmed to close to the boiling point of the solvent prior to immersing. When the molded body is directly immersed in the boiling solvent, surface separation occasionally occurs caused by the rapid temperature change. The preliminary warming may be conducted utilizing the vapor of the boiling solvent.

The dewaxing apparatus used in the method of the invention is composed of, at least, a vessel in which to put the solvent and a heater for heating the solvent. A condenser for recovering by cooling the solvent vapor is provided above the vessel. The condenser may be installed in the vessel or connected to the upper part of the vessel which is of the closed type. When the vessel is of the closed type, it is necessary that the structure of the vessel permits the molded body to be taken in and out. The heater may be disposed in the vessel, or installed on the outside of the vessel to circulate the solvent between the vessel and the heater.

After the molded body is dewaxed by the extraction with the solvent, when a considerable amount of the dispersion medium still remains in the molded body, the dispersion medium may be removed by heating or the like in order not to damage a sintering furnace.

In the method of the invention, the solvent is kept at a uniform temperature by the agitation due to boiling, and the extraction of the dispersion medium is remarkably accelerated by removing solvent containing the dispersion medium in a high concentration from the surface of the molded body and supplying solvent of a low concentration of the dispersion medium to the surface of the molded body.

According to the method of the invention, the dewaxing time can be shortened from about 150 hours to the sum of about 54 hours for the solvent extraction and about 11 hours for dewaxing under heating. The dewaxed molded body is a sound body containing no crack nor expansion.

EXAMPLES

Example 1

To 92 parts by weight of silicon nitride having a mean particle size of 0.25 μm, 2 parts by weight of alumina having a mean particle size of 0.10 μm, 6 parts by weight of yttria having a mean particle size of 0.12 μm, 27 parts by weight of paraffin wax having a melting point of 42° to 44° C. and 3 parts by wight of oleic acid were added, and the composition kneaded with heating to obtain a slurry at 50° C. The slurry was cast in a mold of which the cavity was composed of a disc portion having a size of 50 mm in diameter and 10 mm in thickness and a column portion having a size of 6 mm in diameter and 50 mm in length linked to the center of the disc portion at a slurry supply pressure of 3 kg/cm², and the steering solidified with keeping the above supply pressure. Then, the mold was detached to obtain a molded body.

Subsequently, dewaxing was conducted using the dewaxing apparatus shown in FIG. 1. The apparatus was composed of a condensing zone 2 provided with a water cooled coil 1 located in the upper part, a boiling zone 3 located in the lower part and an electric heater 4 heating the boiling zone from the underside.

Figure 2:
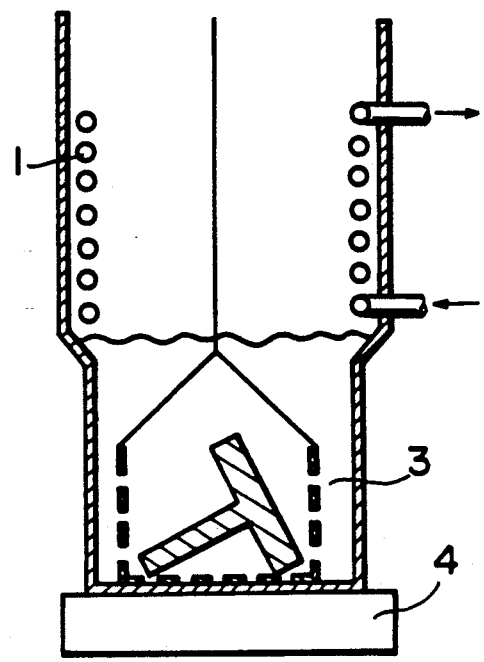

Trichloromonofluoromethane was put in the boiling zone 3, and heated by the heater 4 while cooling water containing an antifreezing fluid at −5° C. was circulated between the coil 1 and a cooler (not illustrated) through the cooling water inlet 5 and the cooling water outlet 6. The trichloromonofluoromethane boiled, and the vapor was condensed at the water cooled coil 1 and refluxed to the boiling zone 3. The temperature of the boiling zone 3 was 24° C. The molded body 7 was put in a stainless steel basket 8, and first hung in the condensing zone 2. The basket 8 was left until the drops of trichloromonofluoromethane were not deposited on both surfaces of the molded body 7 and the basket 8. Subsequently, the basket 8 was immersed in the boiling zone 3 as shown in FIG. 2, and allowed to stand therein for 48 hours. The basket 8 was drawn up to the condensing zone 2, and left for 5 hours. Then, the basket 8 was take out of the dewaxing apparatus. By the above treatment, 67% of the dispersion medium was found to be removed by measuring the body weight of the dewaxed molded body. Besides, there was no defect in the dewaxed molded body.

The dewaxed molded body was heated in a dewaxing oven up to 600° C. at a rate of temperature rise of 60° C./minute and kept at 600° C. for 30 minutes. Then, the molded body was naturally cooled. The molded body thus treated had no defect such as cracking in spite of the relatively rapid heating. The dispersion medium was completely removed from the molded body.

Example 2

To 92 parts by weight of tungsten carbide having a mean particle size of 5 μm, 8 parts by weight of cobalt having a mean particle size of 5 μm and 40 parts by weight of isopropanol were added, and the composition mixed by a ball mill for 24 hours. The mixed powder was dried by a rotary evaporator to obtain a preliminary mixed powder. To 100 parts by weight of this powder, 8.4 parts by weight of paraffin wax having a melting point of 42°–44° C. and 0.5 part by weight of oleic acid, were added and the composition kneaded with heating to obtain a slurry at 50° C. Using the same mold as Example 1, the slurry was molded into a molded body similar to Example 1.

Methylene chloride was put in the boiling zone 3 of the dewaxing apparatus shown in FIG. 1, and boiling in the boiling zone 3 and condensing in the condensing zone 2 were connected. The temperature of the boiling zone was 40° C. The molded body 7 was put in the stainless steel basket 8, and preliminarily heated in the condensing zone 2. Then, the basket 8 was immersed in the boiling zone 3, and allowed to stand therein for 48 hours. The basket 8 was drawn up to the condensing zone 2, and dried therein for 5 hours. By the above treatment, 72% of the dispersion medium was removed. There was no defect in the molded body.

The dewaxed molded body was heated in a dewaxing oven up to 600° C. at a rate of temperature rise of 60° C./minute and kept at 600° C. for 30 minutes. Then, the molded body was naturally cooled. The molded body thus treated had no defect such as cracking in spite of the relatively rapid heating. The dispersion medium was completely removed from the molded body.

I claim:

1. A method for removing a dispersion medium from a metal, ceramic, or metal-ceramic molded body which contains said dispersion medium and which molded body has been formed through a plastic molding, which method comprises:

introducing said molded body containing said dispersion medium into a boiling zone of a boiling solvent which extracts said dispersion medium contained in the molded body;

after said extracting of said dispersion medium, introducing said thus extracted molded body into a zone wherein said solvent is being condensed, and permitting said thus extracted molded body to dry in said condensing zone wherein said solvent is being condensed, whereby a molded body substantially completely free from dispersion medium is obtained.

2. The method of claim 1 wherein said dispersion medium comprises paraffin wax.

3. The method of claim 1 wherein the temperature of said boiling solvent is at 20° and 150° C.

4. The method of claim 2 wherein the solvent is a member selected from the group consisting of trichlorotrifluoroethane, a solvent mixture of trichlorotrifluoroethane and ethanol, a solvent mixture of trichlorotrifluoroethane and methylene chloride, and methylene chloride.

* * * * *